Jan. 16, 1951 W. TRAUTWEIN 2,538,134
TIRE ATTACHMENT
Filed Feb. 15, 1949 2 Sheets-Sheet 1

INVENTOR.
WILLIAM TRAUTWEIN
BY
Robert F. Beck
ATTORNEY

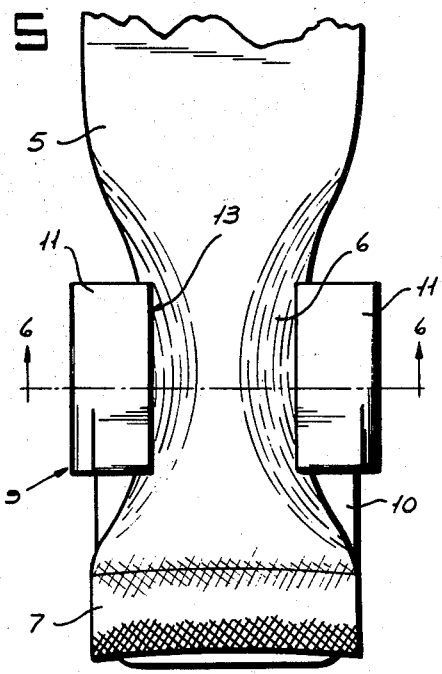
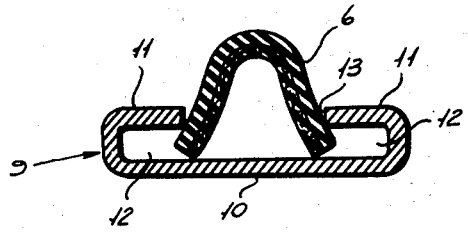
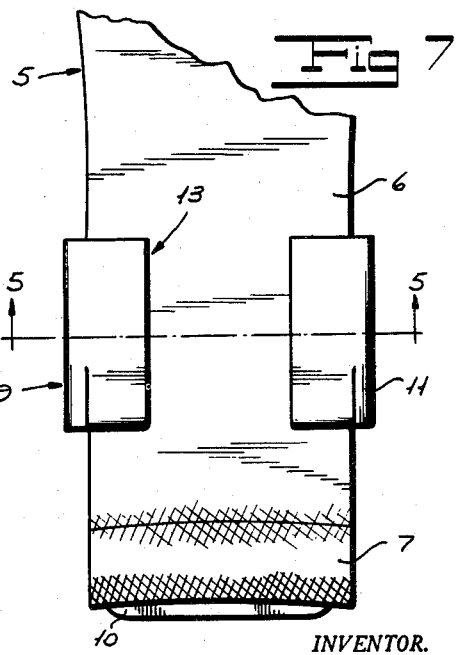
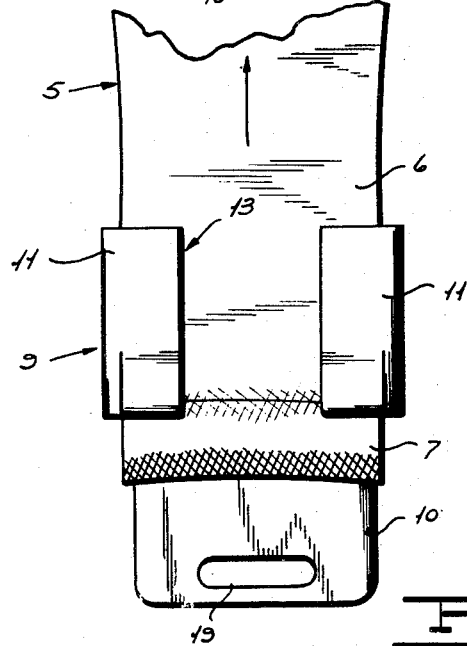

Patented Jan. 16, 1951

2,538,134

UNITED STATES PATENT OFFICE 2,538,134

TIRE ATTACHMENT

William Trautwein, Hawthorne, N. J.

Application February 15, 1949, Serial No. 76,490

4 Claims. (Cl. 152—221)

My invention relates to tire attachments and more particularly to attachments adapted to be quickly secured about an automobile tire to provide a gripping action under road conditions wherein the tire is given to slippage or skidding relative to the road.

One of the objects of my invention is to provide an attachment of the above described character wherein a portion of a discarded tire casing may be utilized to provide a component of the attachment and which is effective for counteracting slippage or skidding.

Another object of my invention is to provide an attachment of the foregoing described character wherein the tread member or component, upon becoming worn, may be readily replaced with another.

An important object of my invention is to provide an attachment of the foregoing described character which is simple in construction, durable in use, efficient in operation, and economical in manufacture.

With the above and other objects in view, as will hereinafter appear, the invention consists in the combination and arrangement of parts hereinafter set forth and illustrated in the accompanying drawings from which the several features of the invention and the advantages attained thereby will be readily understood by those skilled in the art.

Referring to the drawings wherein like reference characters designate like parts throughout the several views:

Figure 3 is a transverse sectional view taken on the line 3—3 of Figure 1.

Figure 4 is a detail side elevation of one end of the tread member and illustrating the same in attached relation with the anchor plate.

Figure 5 is a view similar to Figure 3 but illustrating the tread member in a position for assembly within the pocket of the anchor plate.

Figure 6 is a sectional view taken on the line 6—6 of Figure 5.

Figure 7 is a view similar to Figure 4 but illustrating the tread member in position after insertion within the pocket and previous to the bead being disposed in engagement with the flanges of the anchor plate.

Figure 1:
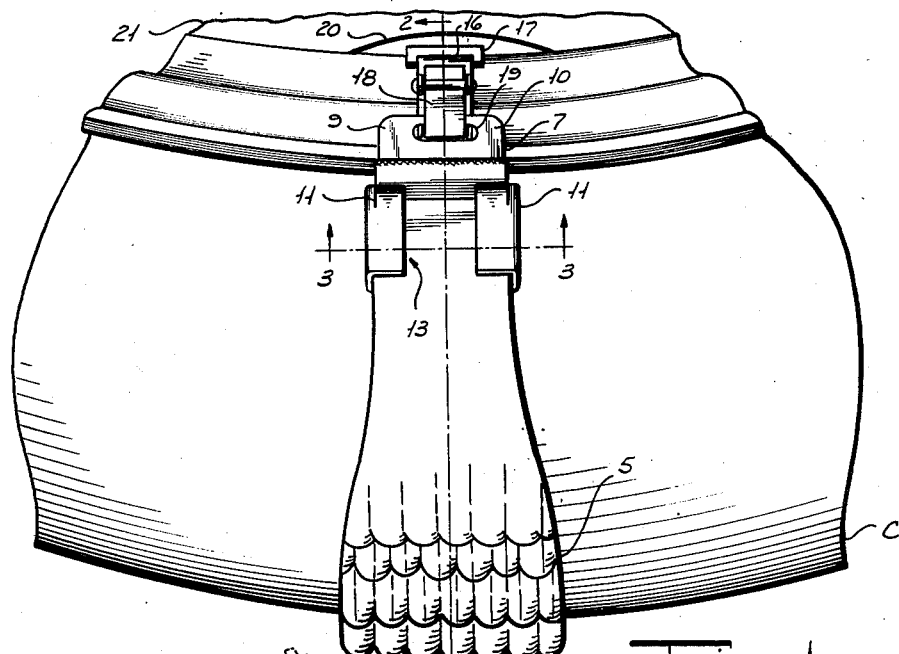
Figure 1 is a side elevation of my invention and illustrating the same secured about a tire mounted on the rim of a motor vehicle wheel.

In practicing my invention, as illustrated in the drawings, I provide an elongated pliable tread member 5, which may constitute a segment of a discarded tire casing, equipped at each end section 6 with a bead 7 having extending therethrough the usual reinforcing wires 8 or the like. The end sections 6 are relatively narrow and are detachably secured to the anchor plates 9 of an attaching device, as hereinafter more fully described, whereby, the attachment is detachably secured about the tire C of a motor vehicle wheel as illustrated in the drawings.

The body portion 10 of each of the anchor plates 9 is provided at one end with a pair of oppositely disposed inwardly extending lateral flanges 11, the latter being spaced from the body portion of the plate to define a pocket 12 accommodating an end section 6 of the tread member and for engaging the bead 7 to preclude detachment of the member from the plate, the bead being of a materially greater thickness than the depth of the pocket. Each pair of the flanges are relatively spaced to define a slot 13 communicating with the respective pocket 12 whereby to permit insertion of the member within the pocket through the slot upon transverse flexing or longitudinal folding of a section 6 as clearly illustrated in Figures 5 and 6 of the drawings.

When the end sections 6 of the member are inserted into the pockets 12, through the slot 13, the anchor plates 9 are moved towards the ends of the member 6 to effect engagement of the beads 7 with the flanges 11, it being understood that the sides of the flanges, which engage the beads, are slightly curved as at 14 to preclude damage to the beads when pressure is exerted thereon. Furthermore, the normal thickness of the end sections 6 is slightly greater than the depth of the pockets whereby to maintain the end sections compressed and in anchored relation with the pockets.

Figure 2:
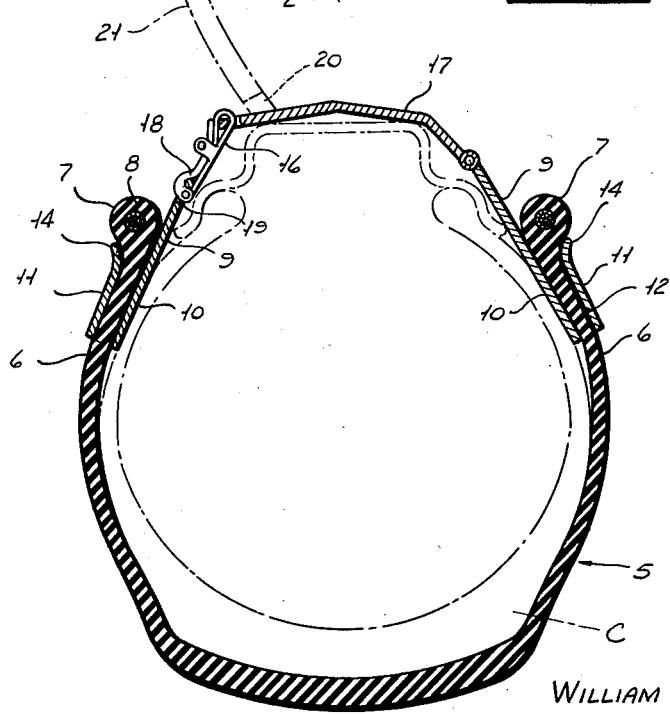
Figure 2 is a sectional view taken on the line 2—2 of Figure 1, the tire and rim being illustrated in dot and dash lines.

The attaching device comprises a link 16 having one end pivoted to a metallic strap 17 hinged to one of the anchor plates 9 and its other end pivotally connected to the end of a hook 18, the latter being disposed through a slot 19 formed in the other anchor plate and folded over the link as illustrated in Figure 2 of the drawing. Inasmuch as the attaching device forms no part of the present invention per se, a detailed disclosure of the same is not deemed necessary, it being understood that any convenient form of attaching device may be utilized in lieu thereof for securing the anchor plates together in connected relation whereby the tread member is maintained embraced about the tire.

In use, assuming the attaching device is in disconnected condition, the member 5 is disposed transversely about the tire C and the link and strap 17 are inserted through the opening 20 in the disc 21 of the wheel whereupon the hook 18 is passed through the slot 19 and folded over the link, thereby, securing the member 5 in connected relation with the tire C. When the attachment is thus connected to the tire, it will be apparent that upon rotation of the tire, the member 5 will serve to grip the road surface or the like and preclude slippage or skidding of the tire relative to the road.

While I have disclosed my invention in connection with a single attachment for use on a tire, it is apparent that any desired number of the same may be attached to the tire as road conditions warrant. Furthermore, it is to be understood that while I have described the member 5 as being constructed from a discarded tire casing, the same may be constructed of other suitable material and provided with a suitable tread face for effectively engaging the road surface.

Without further elaboration, the foregoing will so fully explain the invention that others may, by applying current knowledge, readily adapt the same for use under various conditions of service. Moreover, it is not indispensable that all the features of the invention be used conjointly since they may be employed advantageously in various combinations and subcombinations.

It is obvious that the invention is not confined to the herein described use therefor as it may be utilized for any purpose to which it is adaptable. It is therefore to be understood that the invention is not limited to the specific construction as illustrated and described, as the same is only illustrative of the principles involved which are capable of extended application in various forms, and the invention comprehends all construction within the scope of the appended claims.

What I claim is:

1. In a device of the character described, a segment of a discarded tire adapted to be disposed transversely over the tread of a tire for precluding slippage of the tire relative to a road surface or the like, a pair of detachable elements for securing said segment to the tire and each comprising a body portion having a pair of oppositely disposed inwardly extending lateral flanges spaced from said body portion to define a pocket accommodating an end section and for engaging the adjacent bead of said segment to preclude detachment of said segment from said element by withdrawal of said bead through said pocket, said flanges of each body portion being relatively spaced to define a slot communicating with the respective pocket whereby to permit insertion of said segment within said pocket through said slot upon transverse flexing of said segment.

2. In a device of the character described, an elongated tread member adapted to be disposed transversely over the tread of a tire for precluding slippage of the tire relative to a road surface or the like, a pair of detachable elements for securing said member to the tire and each comprising a body portion formed with a pocket accommodating an end section and a slot communicating with the pocket whereby to permit insertion of said member within said pocket through said slot upon transverse flexing of said member, means carried by said member and cooperating with said body portions to preclude detachment from said pocket, said member being constructed of material having a sufficient pliability to permit said flexing adjacent said means.

3. In a device of the character described, an elongated tread member adapted to be disposed transversely over the tread of a tire for precluding slippage of the tire relative to a road surface or the like, said member having end sections each provided with a marginal bead of a materially greater thickness than the adjacent portion of the end section, a pair of detachable elements for securing said member to the tire and each comprising a body portion having a pair of oppositely disposed inwardly extending lateral flanges spaced from said body portion to define a pocket accommodating an end section and for engaging said bead to preclude detachment of said member from said element by withdrawal of said bead through said pocket, said flanges of each body portion being relatively spaced to define a slot communicating with the respective pocket whereby to permit insertion of said member within said pocket through said slot upon transverse flexing of said member, said member being constructed of material having a sufficient pliability to permit said flexing adjacent said beads.

4. In a device of the character described, an elongated tread member adapted to be disposed transversely over the tread of a tire for precluding slippage of the tire relative to a road surface or the like, said member having end sections each provided with a marginal bead of a materially greater thickness than the adjacent portion of the end section, a pair of detachable elements for securing said member to the tire and each comprising a body portion having a pair of oppositely disposed inwardly extending lateral flanges spaced from said body portion to define a pocket accommodating an end section and for engaging said bead to preclude detachment of said member from said element by withdrawal of said bead through said pocket, said flanges of each body portion being relatively spaced to define a slot communicating with the respective pocket whereby to permit insertion of said member within said pocket through said slot upon transverse flexing of said member, said member being constructed of material having a sufficient pliability to permit said flexing adjacent said beads, and of a greater thickness adjacent said beads than the depth of said pockets to maintain the member compressed within said pockets.

WILLIAM TRAUTWEIN.

REFERENCES CITED

The following references are of record in the file of this patent:

UNITED STATES PATENTS

| Number | Name | Date |
| --- | --- | --- |
| 1,213,256 | Pyros | Jan. 23, 1917 |
| 1,570,851 | Metcalfe | Jan. 26, 1926 |
| 1,887,404 | Fitzgerald | Nov. 8, 1932 |
| 1,963,939 | Dodge | June 19, 1934 |